(12) United States Patent
Huang

(10) Patent No.: US 9,154,679 B2
(45) Date of Patent: Oct. 6, 2015

(54) CAMERA APPARATUS AND PORTABLE ELECTRONIC DEVICE USING SAME HAVING A REFLECTING ELEMENT ARRANGED BETWEEN TWO LENS ELEMENTS

(71) Applicant: Chiun Mai Communication Systems, Inc., New Taipei (TW)

(72) Inventor: Yu-Chia Huang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 13 days.

(21) Appl. No.: 14/132,502

(22) Filed: Dec. 18, 2013

(65) Prior Publication Data

US 2014/0327818 A1    Nov. 6, 2014

(30) Foreign Application Priority Data

May 2, 2013   (TW) .............................. 102115741 A

(51) Int. Cl.
*H04N 5/225* (2006.01)
*G02B 13/16* (2006.01)

(52) U.S. Cl.
CPC ........... *H04N 5/2254* (2013.01); *H04N 5/2251* (2013.01)

(58) Field of Classification Search
None
See application file for complete search history.

(56) References Cited

U.S. PATENT DOCUMENTS

| 7,453,517 | B2 * | 11/2008 | Fujimoto et al. | 348/374 |
| 7,567,287 | B2 * | 7/2009 | Hyatt | 348/340 |
| 2006/0109567 | A1 * | 5/2006 | Chen | 359/696 |
| 2008/0019684 | A1 * | 1/2008 | Shyu et al. | 396/332 |
| 2008/0266443 | A1 * | 10/2008 | Lee | 348/344 |
| 2009/0009650 | A1 * | 1/2009 | Liu et al. | 348/340 |
| 2012/0044368 | A1 * | 2/2012 | Lin et al. | 348/208.2 |
| 2013/0093858 | A1 * | 4/2013 | Lee | 348/49 |
| 2014/0055624 | A1 * | 2/2014 | Gaines et al. | 348/207.1 |
| 2014/0218587 | A1 * | 8/2014 | Shah | 348/340 |

FOREIGN PATENT DOCUMENTS

WO     WO 2012090257     *  7/2012

* cited by examiner

*Primary Examiner* — Sinh Tran
*Assistant Examiner* — Shahbaz Nazrul
(74) *Attorney, Agent, or Firm* — Novak Druce Connolly Bove + Quigg LLP

(57) ABSTRACT

A camera apparatus is installed in a portable electronic device. The camera apparatus includes an image sensing module and a double lens module. The double lens module includes a case, a first lens, a second lens, and a reflecting element. The first lens and the second lens are symmetrically positioned in the case, and the reflecting element is received in the case and positioned between the first lens and the second lens. The reflecting device reflects light passing through the first lens or the second lens to the image sensing module.

7 Claims, 5 Drawing Sheets

CAMERA APPARATUS AND PORTABLE ELECTRONIC DEVICE USING SAME HAVING A REFLECTING ELEMENT ARRANGED BETWEEN TWO LENS ELEMENTS

BACKGROUND

1. Technical Field

The present disclosure relates to lens modules, and particularly to a camera apparatus having a double lens module for portable electronic devices.

2. Description of Related Art

Camera apparatus are included in most portable electronic devices. Most camera apparatuses nowadays have two lens modules and two image sensors to capture images from opposite sides of the portable electronic device.

However, the portable electronic devices have limited space for assembling the camera apparatus therein.

Therefore, there is room for improvement within the art.

BRIEF DESCRIPTION OF THE DRAWING

Many aspects of the camera apparatus for portable electronic device can be better understood with reference to the following drawings. The components in the drawings are not necessarily drawn to scale, the emphasis instead being placed upon clearly illustrating the principles of the camera apparatus for portable electronic device. Moreover, in the drawings, like reference numerals designate corresponding parts throughout the several views.

DETAILED DESCRIPTION

Figure 1:
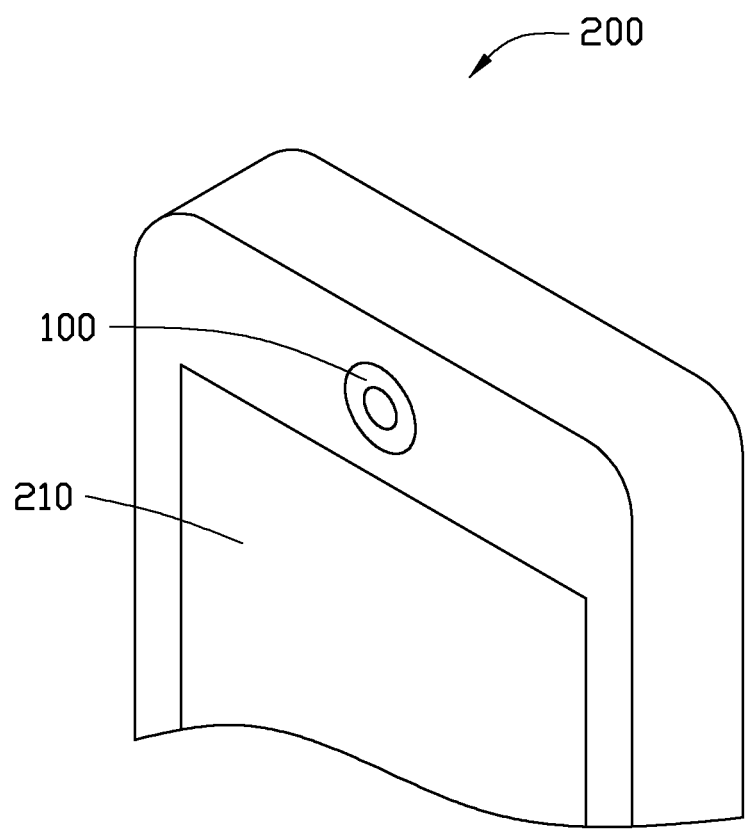
FIG. 1 is a partial isometric view of an embodiment of a portable electronic device having a camera apparatus.

FIG. 1 shows a portable electronic device 200 (partially shown) comprising a camera apparatus 100 and a display 210. The camera apparatus 100 is electronically connected to the display 210 for allowing the display 210 to display images from the camera apparatus 100.

Figure 2:
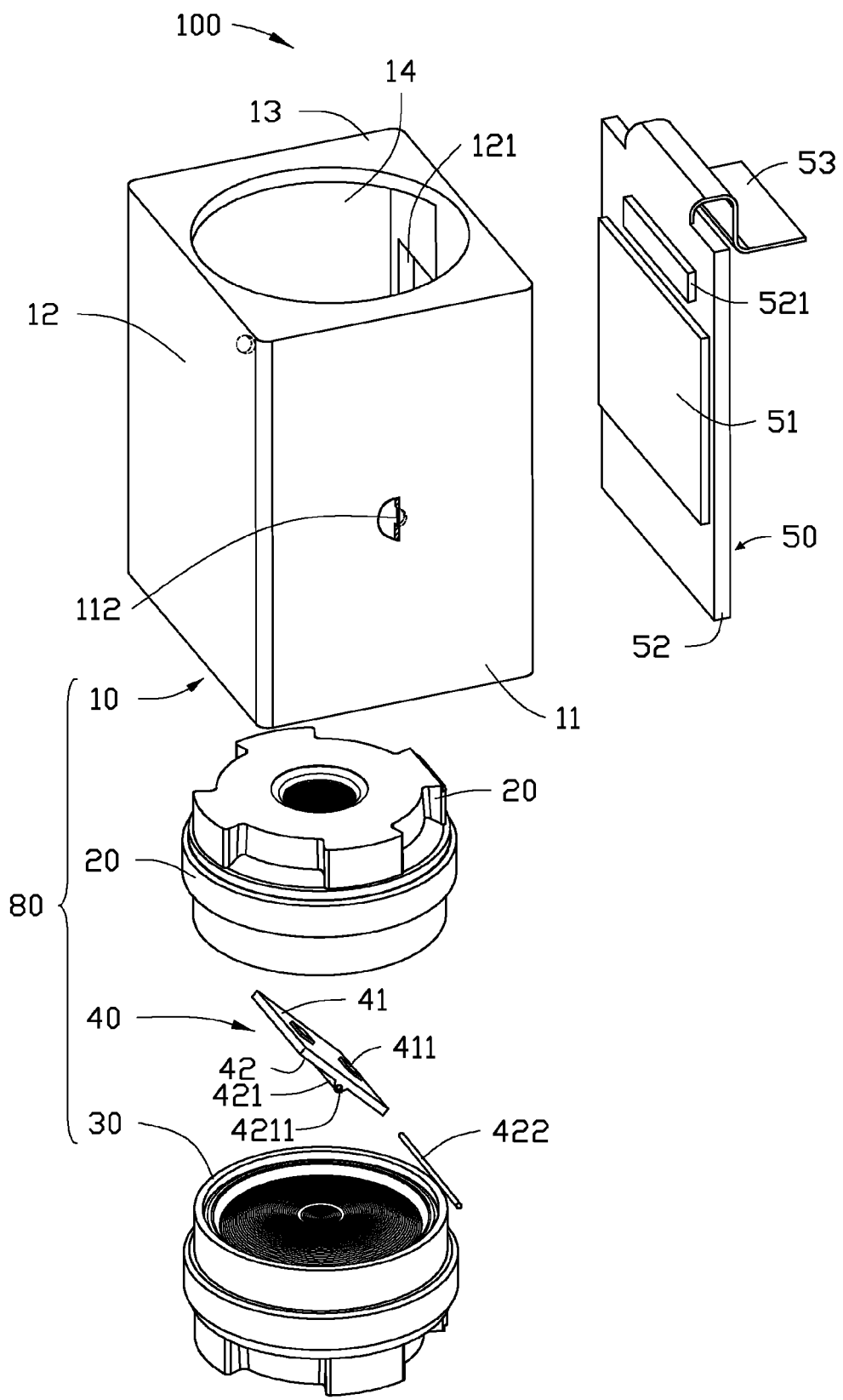
FIG. 2 is an exploded view of the camera apparatus of FIG. 1.

Referring to FIG. 2, the camera apparatus 100 comprises an image sensing module 50 and a double lens module 80. The double lens module 80 includes a case 10, a first lens 20, a second lens 30, and a reflecting element 40. The first lens 20 and the second lens 30 are symmetrically positioned in the case 10, and the reflecting element 40 is received in the case 10 and positioned between the first lens 20 and the second lens 30. An image is captured by the first lens 20 or the second lens 30 and converted into an electronic signal by the image sensing module 50. The electronic signal is stored as a digital signal.

The case 10 is substantially a cube and comprises two first opposite sidewalls 11, two second opposite sidewalls 12, and two opposite end walls 13. A through hole 14 is defined through the two end walls 13. The through hole 14 acts as an aperture for the first lens 20 and the second lens 30. An inside surface of each first sidewall 11 defines a mounting hole 112 for rotatably connecting the reflecting device 40. One of the two second sidewalls 12 defines an opening 121 for assembling the image sensing module 50 to the case 10.

The first lens 20 and the second lens 30 are arranged along a central axis of the through hole 14. The first lens 20 and the second lens 30 are made of several lens elements for receiving light from outside the camera apparatus 100. The first lens 20 is exposed from one end wall 13, while the second lens 30 is exposed from the other end wall 13.

Figure 3:
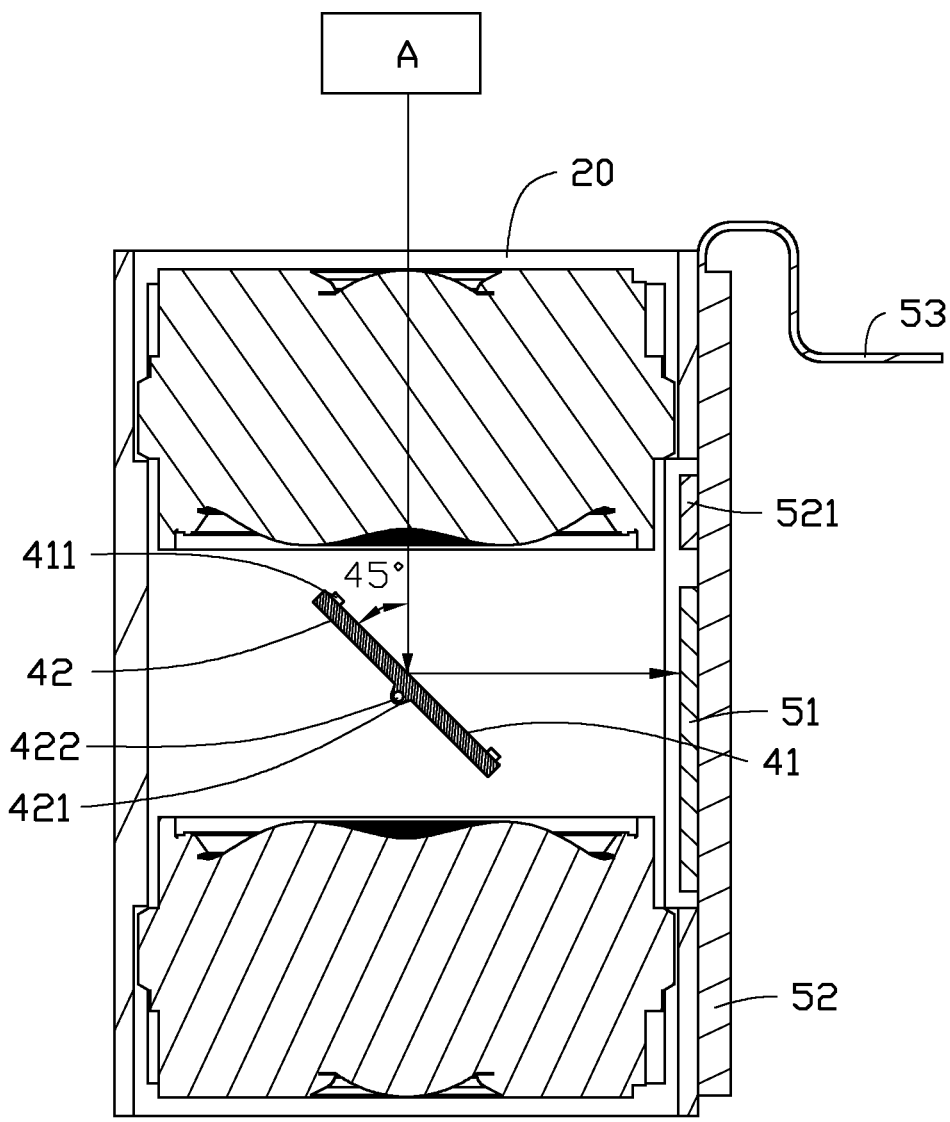
FIG. 3 is a cross-sectional view of FIG. 1.
Figure 4:
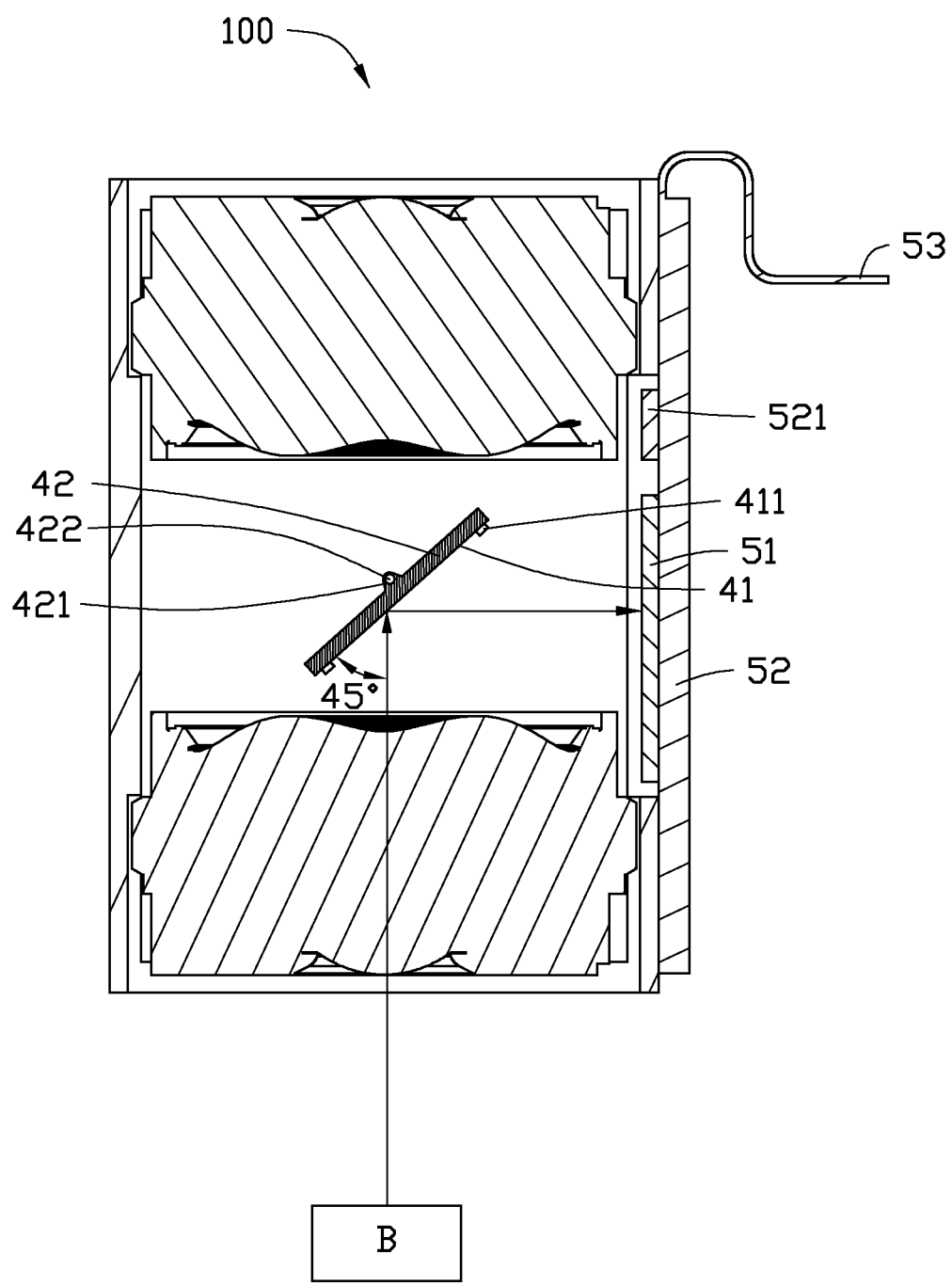
FIG. 4 is another cross-sectional view of FIG. 1.

Referring to FIGS. 3 and 4, the reflecting device 40 is positioned between the first lens 20 and the second lens 30 for reflecting light beams passing through the first lens 20 or the second lens 30 to the image sensing module 50. The reflecting device 40 can be made of any suitable material that can reflect a suitable percentage of light. The reflecting device 40 includes a first surface 41 and a second surface 42. Two magnet blocks 411 are located at opposite sides of the first surface 41, respectively. The two magnet blocks 411 can rotate the reflecting device 40 under a magnetic field. In an initial state, the reflecting device 40 is substantially parallel to the first lens 20 and the second lens 30. When the first lens 20 is in use, the magnetic field controls the magnet blocks 411 to rotate the reflecting device 40, such that light beams passing through the first lens 20 are reflected to the image sensing module 50. When the second lens 30 is in use, the magnetic field controls the magnet blocks 411 to rotate the reflecting device 40, such that light beams passing through the second lens 30 are reflected to the image sensing module 50. The second surface 42 has a knuckle portion 421 defining a pivot hole 4211. A pivot shaft 422 is received through the pivot hole 4211. Opposite ends of the pivot shaft 422 are received in the mounted hole 112 to allow the reflecting device 40 to rotate around the pivot shaft 422.

The image sensing module 50 includes an image sensor chip 51, a printed circuit board (PCB) 52, and a flex printed circuited board (FPCB) 53. The image sensor chip 51 can be, but is not limited to be, a charge-coupled device (CCD) or a complementary metal-oxide semiconductor (CMOS). The PCB 52 is mounted to the second sidewall 12 defining the opening 121. In this exemplary embodiment, the PCB 52 is adhered to the second sidewall 12. The image sensor chip 51 is located on the PCB 52 and received in the case 10 through the opening 121. A first end of the FPCB 53 is physically and electronically connected to one end of the PCB 52, while a second end of the FPCB 53 is electronically connected to the electronic device 200. The image sensor chip 51 receives light signals reflected by the reflecting device 40 and converts the light signals into electronic signals. The electronic signals are transmitted to the PCB 52, and the PCB 52 further transmits the electronic signals to the FPCB 53. The FPCB 53 transmits the electronic signals to a processor of the electronic device 200. The processor of the electronic device 200 converts the electronic signals into digital signals and displays the digital signals on the display 210. The PCB 52 has a control unit 521 for controlling the magnetic field to rotate the reflecting device 40.

Figure 5:
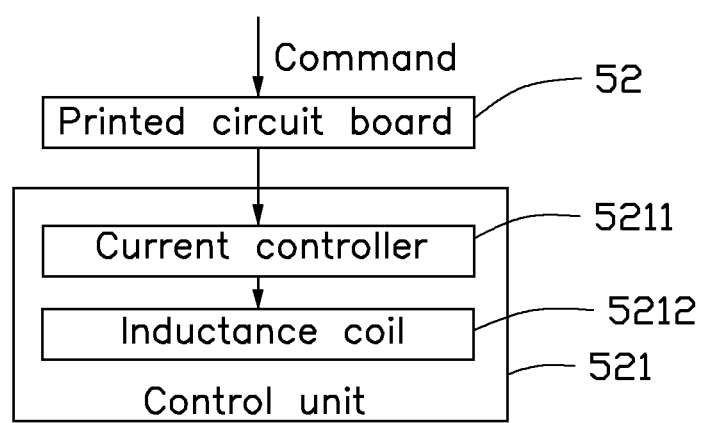
FIG. 5 is a block diagram of a control unit of FIG. 2.

Referring to FIG. 5, the control unit 521 includes a current controller 5211 and an inductance coil 5212 electronically connected to the current controller 5211. The current controller 5211 is electronically connected to the PCB 52 and can output different currents according to different commands of the electronic device 200. The inductance coil 5212 produces a magnetic field after the inductance coil 5212 is electrified. An intensity of the magnetic field produced by the inductance coil 5212 is proportional to the current value. The magnetic field produced by the inductance coil 5212 drives the two magnet blocks 411 to rotate the reflecting device 40. The electronic device 200 has a control menu (not shown) to allow a user to choose the first lens or the second lens to capture images.

In assembly, referring to FIGS. 3 and 4, the pivot shaft 422 is received through the pivot hole 4211 of the knuckle portion 421. The opposite ends of the pivot shaft 422 are received in the mounted hole 112 to allow the reflecting device 40 to rotate around the pivot shaft 422. Then, the first lens 20 and the second lens 30 are assembled in the case 10. The first lens 20 is exposed from one end of the through hole 14, and the second lens 30 is exposed from another end of the through hole 14. The PCB 52 is adhered to the second sidewall 12. The image sensor chip 51 is mounted to the PCB 52 and received in the case 10 through the opening 121. One end of the FPCB 53 is physically and electronically connected to one end of the PCB 52, while the other end of the FPCB 53 is electronically connected to the electronic device 200.

Referring to FIG. 3, when the first lens 20 is chosen by the user to capture an image A, the electronic device 200 sends a control command to the current controller 5211 through the PCB 52. The current controller 5211 outputs current to the inductance coil 5212. The inductance coil 5212 produces a magnetic field to rotate the first surface 41 of the reflecting device 40, such that light beams passing through the first lens 20 are reflected to the image sensor chip 51. The image sensor chip 51 converts the light signals into electronic signals. The electronic signals are transmitted to the PCB 52, and the PCB 52 further transmits the electronic signals to the FPCB 53. The FPCB 53 transmits the electronic signals to the processor of the electronic device 200, and the processor converts the electronic signals into digital signals and displays the digital signals on the display 210.

Referring to FIG. 4, when the second lens 30 is selected to capture an image B, the electronic device 200 sends a control command to the current controller 5211 through the PCB 52. The current controller 5211 outputs current to the inductance coil 5212. The inductance coil 5212 produces a magnetic field to rotate the first surface 41 of the reflecting device 40, such that light beams passing through the second lens 30 are reflected to the image sensor chip 51.

It is to be understood, however, that even through numerous characteristics and advantages of exemplary embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A camera apparatus comprising:
an image sensing module; and
a double lens module comprising:
    a case;
    a first lens;
    a second lens, the first lens and the second lens arranged along an axis; and
    a reflecting element, the reflecting element includes a first surface and a second surface opposite to each other, two opposite magnet blocks are formed opposite sides of the first surface, the image sensing module includes a control unit, the control unit includes a current controller and an inductance coil, the inductance coil is electrified to produce a magnet field which applies on the two magnet blocks to rotate the reflecting element;
    wherein the second surface having a knuckle portion defining a pivot hole, and a pivot shaft accommodates in the pivot hole, opposite ends of the pivot shaft mounted in the case to allow the reflecting element to rotate around the pivot shaft;
    wherein the first lens and the second lens are symmetrically positioned in the case, and the reflecting element is received in the case, and is positioned between the first lens and the second lens, the reflecting element reflects light beams caught by one of the first lens and the second lens to the image sensing module.

2. The camera apparatus as claimed in claim 1, wherein the image sensing module includes an image sensor chip, a printed circuit board, and a flex printed circuited board, the printed circuit board is mounted to the case, the image sensor chip is mounted to the printed circuit board, and is received in the case, the flex printed circuited board is mechanically and electronically connected to one end of the printed circuited board.

3. The camera apparatus as claimed in claim 2, wherein the case includes opposite first sidewalls, opposite second sidewalls, and opposite end walls, a through hole is defined in the case, and communicates with the two end walls, the first lens is exposed from one end of the through hole, and the second lens is exposed from another end of the through hole.

4. The camera apparatus as claimed in claim 3, wherein one of the two second sidewalls defines an opening, the image sensor chip is mounted to the printed circuited board, and is received in the case through the opening.

5. A portable electronic device, comprising:
a display; and
a camera apparatus comprising:
    an image sensing module; and
    a double lens module comprising:
        a case;
        a first lens;
        a second lens, the first lens and the second lens arranged along an axis; and
        a reflecting element, the reflecting element includes a first surface and a second surface opposite to each other, two opposite magnet blocks are formed opposite sides of the first surface, the image sensing module includes a control unit, the control unit includes a current controller and an inductance coil, the inductance coil is electrified to produces a magnet field which applies on the two magnet blocks to rotate the reflecting element;
        wherein the second surface having a knuckle portion defining a pivot hole, and a pivot shaft accommodates in the pivot hole, opposite ends of the pivot shaft mounted in the case to allow the reflecting element to rotate around the pivot shaft;
    wherein the first lens and the second lens are symmetrically positioned in the case, and the reflecting element is received in the case, and is positioned between the first lens and the second lens, the reflecting element reflects light beams caught by one of the first lens and the second lens to the image sensing module.

6. The portable electronic device as claimed in claim 5, wherein the image sensing module include an image sensor chip, a printed circuit board, and a flex printed circuited board, the printed circuit board is mounted to the case, the image sensor chip is mounted to the printed circuit board, and is received in the case, the flex printed circuited board is mechanically and electronically connected to one end of the printed circuited board.

7. The portable electronic device as claimed in claim 6, wherein the case includes opposite first sidewalls, opposite second sidewalls, and opposite end walls, a through hole is defined in the case, and communicates with the two end walls, the first lens is exposed from one end of the through hole, and the second lens is exposed from another end of the through hole.

* * * * *